(12) United States Patent
Feng

(10) Patent No.: US 11,506,234 B2
(45) Date of Patent: Nov. 22, 2022

(54) TELESCOPIC ROD CONNECTOR AND TELESCOPIC ROD ASSEMBLY

(71) Applicant: Greyma Home Rich Limited, Denver, CO (US)

(72) Inventor: Yan Feng, Hengyang (CN)

( * ) Notice: Subject to any disclaimer, the term of this patent is extended or adjusted under 35 U.S.C. 154(b) by 439 days.

(21) Appl. No.: 16/746,942

(22) Filed: Jan. 19, 2020

(65) Prior Publication Data
US 2021/0222714 A1    Jul. 22, 2021

(51) Int. Cl.
*F16B 7/10* (2006.01)
*F16B 7/14* (2006.01)

(52) U.S. Cl.
CPC .............. *F16B 7/10* (2013.01); *F16B 7/1427* (2013.01)

(58) Field of Classification Search
CPC .................................. F16B 7/10; F16B 7/1427
See application file for complete search history.

(56) References Cited

U.S. PATENT DOCUMENTS

| 10,426,287 B1* | 10/2019 | Tsai ...................... A47H 1/022 |
| 2019/0274486 A1 | 9/2019 | Broe |
| 2019/0360264 A1 | 11/2019 | Tan |
| 2019/0368637 A1* | 12/2019 | Lai .......................... F16B 7/105 |

* cited by examiner

*Primary Examiner* — Anita M King

(57) ABSTRACT

The present invention discloses a telescopic rod connector, which includes an outer sleeve, an inner sleeve and a screw rod. The screw rod has opposite a first end and a second end, and a rod body between them. The inner sleeve sleeves on the rod body and can rotate and slide along it, and the inner sleeve is provided with positioning convex strips. The outer sleeve includes a notch ring and a plurality of outer arc members extending from the notch ring. U-shaped notches are arranged between adjacent two the outer arc members; the outer sleeve is arranged on the outside of the inner sleeve and the notch ring is close to the first end, and the positioning convex strips are inserted into the U-shaped notches. The outer sleeve is rotated to drive the inner sleeve to slide along the rod body.

15 Claims, 3 Drawing Sheets

TELESCOPIC ROD CONNECTOR AND TELESCOPIC ROD ASSEMBLY

TECHNICAL FIELD

The present invention relates to the technical field of telescopic rod, in particular, to telescopic rod connector and telescopic rod assembly.

BACKGROUND

In the prior art, both ends of telescopic rod are mostly mounted on the wall or door frame by installation components. For example Chinese Utility Model patent CN209750717U discloses a telescopic rod for automatic clamping installation, which includes main body of the telescopic rod and a supporting plate, a fixing block is fixedly mounted on its out surface of the main body, and the main body of the telescopic rod and the fixing block are connected with a supporting frame, the fixing block is provided with a first receiving slot internally, and a first limiting plate is installed inside the first receiving slot. Its left of the fixing block is provided with a limiting slot which is arranged on the left side of the supporting frame. The limiting slot is connected with its bottom end of a first limiting rod, and its outside of the first limiting rod is provided with a first connection spring. The utility model is convenient for automatic clamping installation of the telescopic rod, and the staff only need to manually install the fixed block on the main body of the telescopic rod body to the supporting frame. After manually loosening the main body of the telescopic rod, the telescopic rod will automatically carry out the fixed installation through gravity and the internal structure, thus improving the convenience of the installation.

However, the telescopic rod needs the supporting frame and the fixing block to be installed, which is not convenient in practical use.

U.S. Pat. No. 10,426,287B1 discloses a telescopic rod structure, which includes an inner rod, an outer rod and a locking unit arranged between them. The locking unit is used for adjusting the length of the telescopic rod. It achieves to adjust the length of the telescopic rod by rotating the inner tube or outer tube, thus adjusting the length of the packing cover of the locking unit in the outer tube. The structure can flexibly adjust the length of the telescopic rod. However, the structure does not change the defects that the telescopic rods need to be mounted between door frames or walls with the aid of mounting components.

SUMMARY

In order to overcome the shortcomings of the prior art, the present invention provided with a telescopic rod connector and telescopic rod assembly, which resolves the defects that the telescopic rods need to be mounted between door frames or walls with the aid of mounting components.

The technical proposals of the present invention are as follows:

A telescopic rod connector comprises a screw rod, an inner sleeve and an outer sleeve.

The screw rod has opposite a first end and a second end, and a rod body between them.

The inner sleeve sleeves on the rod body and can rotate and slide along the rod body, the inner sleeve is provided with positioning convex strips.

The outer sleeve includes a notch ring and a plurality of outer arc members extending from the notch ring. U-shaped notches are arranged between adjacent two the outer arc members, and the number of the U-shaped notches is equal to that of the positioning convex strips; the outer sleeve is wrapped around the inner sleeve and the notch ring is close to the first end, and the positioning convex strips are inserted into the U-shaped notches, respectively.

The outer sleeve is rotated to drive the inner sleeve to slide along the rod body; when the inner sleeve is sliding from the first end to the second end, the outer arc members are squeezed and opened, and when the inner sleeve is sliding from the second end to the first end, the outer arc members are closed up.

A first helix and a first lifting groove are wound around the rod body.

The inner sleeve includes at least two arc members and at least one connecting piece, one connecting piece connects adjacent two the arc members to form a breaking cylinder with at least a notch. The inner sleeve is provided with a second helix and a second lifting groove on the arc member; the first helix is matched with the second lifting groove, and the second helix is matched with the first lifting groove so that the inner sleeve can rotate and slide around the rod body; its outer wall of the arc member is provided with the positioning convex strips.

Its diameter of the rod body increases gradually from the first end to the second end.

Its thickness of the outer arc member increases gradually from the notch ring.

The second end is provided with a first limiting plane.

The first end is provided with a cylinder with a limiting ring protruding outward near one side of the rod body.

A telescopic rod assembly, includes an inner rod, an outer rod and a telescopic rod connector connecting them, the telescopic rod connector comprises a screw rod, an inner sleeve and an outer sleeve.

The screw rod has opposite a first end and a second end, and a rod body between them, the first end is fixedly connected with the inner rod.

The inner sleeve sleeves on the rod body and can rotate and slide along the rod body, and the inner sleeve is provided with positioning convex strips.

The outer sleeve includes a notch ring and a plurality of outer arc members extending from the notch ring. U-shaped notches are arranged between adjacent two the outer arc members, and the number of the U-shaped notches is equal to that of the positioning convex strips; the outer sleeve is wrapped around the inner sleeve and the notch ring is close to the first end, and the positioning convex strips are inserted into the U-shaped notches, respectively.

The telescopic rod connector and said inner rod are are inserted into the outer rod, the outer rod is rotated relative to the inner rod, driving the outer sleeve to rotate; the outer sleeve drive the inner sleeve to rotate and slide along the rod body; when the inner sleeve is sliding from the first end to the second end, the outer arc members are squeezed and opened so that the outer rod is relatively fixed with the inner rod, and when the inner sleeve is sliding from the second end to the first end, the outer arc member is closed up so that the outer rod can be detachable from the inner rod.

The outer rod has an outer rod end, the outer rod end is provided with a shrinkage opening, its diameter of the shrinkage opening is smaller than the inner diameter of the outer rod, the second end is provided with a first limiting plane, and the diameter of the first limiting plane is smaller than the diameter of the shrinkage opening.

The second end is also provided with a second limiting plane, the diameter of the second limiting plane is slightly larger than the diameter of the first limiting plane and the diameter of the shrinkage opening, and less than the inner diameter of the outer rod.

The first end is provided with a cylinder with a limiting ring protruding outward near one side of the rod body, the cylinder matches with the inner rod, its outer diameter of the limiting ring is slightly larger than its inner diameter of the inner rod.

A first helix and a first lifting groove are wound around the rod body.

The inner sleeve includes at least two arc members and at least one connecting piece, the connecting piece connects adjacent two the arc members to form an breaking cylinder with at least a notch, the inner sleeve is provided with a second helix and a second lifting groove on the arc members; the first helix is matched with the second lifting groove, and the second helix is matched with the first lifting groove so that the inner sleeve can rotate and slide around the rod body; the outer wall of the arc members is provided with the positioning convex strips.

Its outer diameter of the rod body increases gradually from the first end to the second end.

Its thickness of the outer arc member increases gradually from the notch ring.

The beneficial effects of the invention are as follows: In the present invention, when it needs to mount the telescopic rod assembly between door frames or two walls, firstly, adjust the length of the inner rod in the outer rod so that the length of the telescopic rod assembly is slightly smaller than the distance between the door frames or the two walls. Then place the telescopic rod assembly between the door frames or the walls, and attach the free end of the inner rod to one of the door frames or one of the walls. Then rotate the outer rod relative to the inner rod to drive the outer sleeve to rotate. The outer sleeve drives the inner sleeve to rotate and slide away from the first end along the rod body, the inner sleeve squeezes the outer arc members and opens the outer arc members so that the outer rod is relatively fixed with the inner rod and the length of the telescopic rod assembly increases to equal to the distance of the door frames or the distance of the walls, setting up the telescopic rod assembly between the door frames or the two walls. When it needs to disassemble the telescopic rod assembly, it can be achieved by reversely rotating the outer rod, releasing the fixed connection between the outer rod and the inner rod, and reducing the length of the telescopic rod assembly. With using the telescopic rod connector, it realizes that the telescopic rod assembly can be mounted between door frames or two walls without the aid of the mounting assembly, and the disassembly and the assembly of the telescopic rod assembly are very convenient. The length of the telescopic rod assembly is flexibly adjusted and it is easy to use.

DETAILED DESCRIPTION OF EMBODIMENTS

For the purpose of the present invention, the technical scheme and the technical effect are more clearly understood. It should be understood that the specific embodiments described herein are only used to interpret the present invention and are not used to qualify the present invention.

Figure 5:
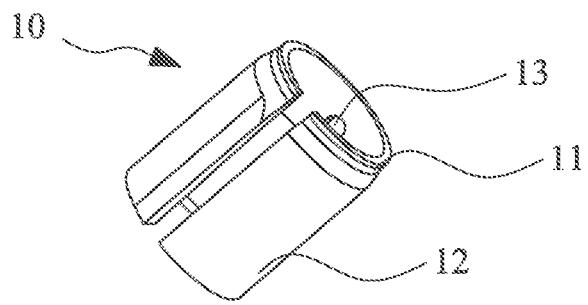
FIG. 5 is a perspective view of the telescopic rod connector according to the present invention.
Figure 6:
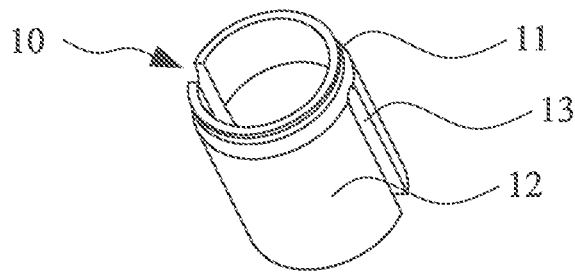
FIG. 6 is the other perspective view of the telescopic rod connector according to the present invention.

Referring to FIG. 1, FIG. 2, FIG. 3 and FIG. 4, the present invention discloses a telescopic rod connector 1, which includes an outer sleeve 10, an inner sleeve 20 and a screw rod 30. The screw rod 30 has opposite a first end 31, a second end 32 and a rod body 33 between the first end 31 and the second end 32. The inner sleeve 20 sleeves on the rod body 33 and can rotate and slide along the rod body 33, the inner sleeve 20 is provided with positioning convex strips 21. Referring to FIG. 5 and FIG. 6, the outer sleeve 10 includes a notch ring 11 and a plurality of outer arc members 12 extending from the notch ring 11. U-shaped notches 13 are arranged between adjacent two the outer arc members 12, and the number of the U-shaped notches 13 is equal to that of the positioning convex strips 21; the outer sleeve 10 is wrapped around the inner sleeve 20 and the notch ring 11 is close to the first end 31, and the positioning convex strips 21 are inserted into the U-shaped notches 13, respectively.

The outer sleeve 10 is rotated to drive the inner sleeve 20 to slide along the rod body 33. If the inner sleeve 20 is sliding from the first end 31 to the second end 32, the outer arc members 12 are squeezed and opened, and if the inner sleeve 20 is sliding from the second end 32 to the first end 31, the outer arc members 12 can be closed up.

Figure 1:
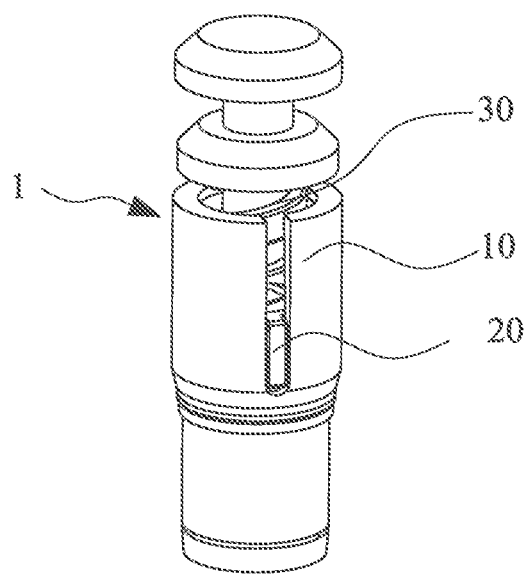
FIG. 1 is a perspective view of the telescopic rod connector according to the present invention.
Figure 2:
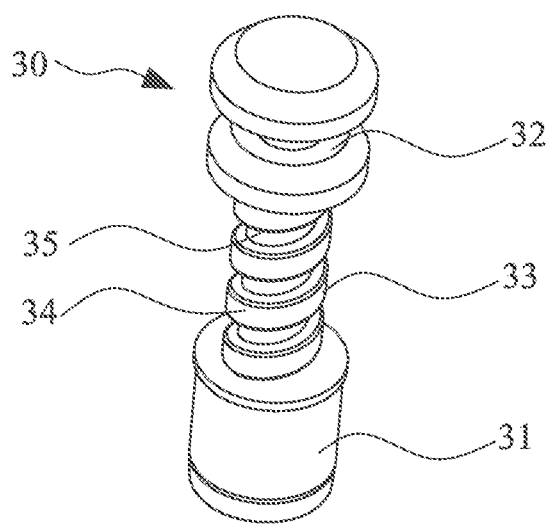
FIG. 2 is a perspective view of the screw rod of the telescopic rod connector according to the present invention.

Referring to FIG. 2, in some examples, a first helix 34 and a first lifting groove 35 are wound around the rod body 33 of the screw rod 30. The first helix 34 and the first lift groove 35 are alternately arranged at intervals.

Figure 3:
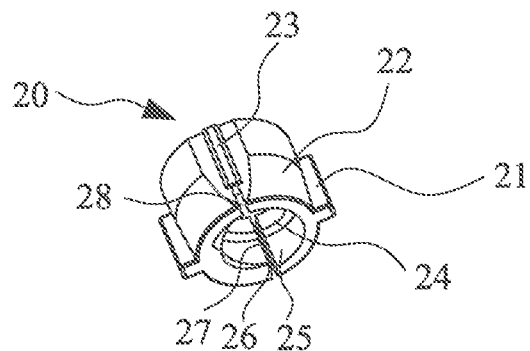
FIG. 3 is a perspective view of the inner sleeve of the telescopic rod connector according to the present invention.
Figure 4:
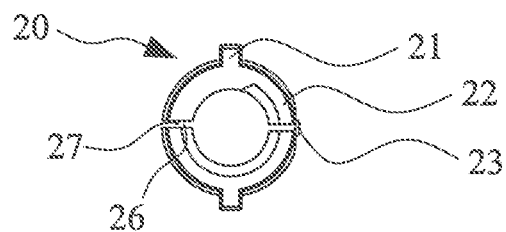
FIG. 4 is a perspective view of the outer sleeve of the telescopic rod connector according to the present invention.

Referring to FIG. 3 and FIG. 4, the inner sleeve 20 comprises at least two arc members 22 and at least one connecting piece 23. The connecting piece 23 connects adjacent two the arc members 22 to form a breaking cylinder with at least a notch 26. It should be understood that the number of the arc members 22 and that of the connecting piece 23 can be designed as needed. When the size of the rod body 23 is larger, the number of the arc members 22 is more than 2, for example, 3 or 4, accordingly, the number of the connectors 23 is 2 and 3.

Referring to FIG._3 and FIG._4, the inner sleeve 20 is provided with second helix 24 and a second lifting groove 25 on the arc members 22; the first helix 34 is matched with the second lifting groove 25, and the second helix 24 is matched with the first lifting groove 35 so that the inner sleeve 20 can rotate and slide around the rod body 33. It should be understood that the second helix 24 is correspondingly arranged on the inner wall of the arc members 22, respectively, and the second lifting groove 25 is correspondingly arranged on the inner wall of the arc members 2.

The arc members 22 are capable of rotating around the connecting piece 23 they attaches, thus opening the inner sleeve 20 for easy mounting on the rod body 33. At the notch 26, slots (not shown) and convexes 27 matching each other are arranged on the side of the arc members 22. When the inner sleeve 20 is wrapped by the out sleeve 10, the convexes 27 are inserted into the slots, thus locking the inner sleeve 20.

Preferably, the height of the connecting pieces 23 is less than the height of the arc members 22, so that a second notch 28 is formed between the two arc members 22.

The arc members 22 are provided with the positioning convex strip 21, which is preferably arranged in the same direction as the center axis of the rod body 33.

When the out sleeve 10 is rotated, it drives the inner sleeve 20 to rotate and slide along the rod body 33 through the cooperation of the U-shaped notches 13 and the positioning convex strips 21. When the inner sleeve 20 slides from the first end 31 to the second end 32, it extrudes and opens the outer arc members 12, when the inner sleeve 20 slides from the second end 32 to the first end 31, the outer arc members 12 can be closed up. The U-shaped notches 13 provided sufficient space for the outer arc members 12 to open or close up.

Preferably, the outer diameter of the rod body 33 increases gradually from the first end 31 to the second end 32. These structure enables the inner sleeve 20 to further open the outer arc members 12 when it rotates from the first end 31 to the second end 32.

The thickness of the outer arc member 12 increases gradually from the opening ring 11. These structure enables the inner sleeve 20 to further open the outer arc members 12 when the inner sleeve 20 rotates from the first end 31 to the second end 32.

Figure 7:
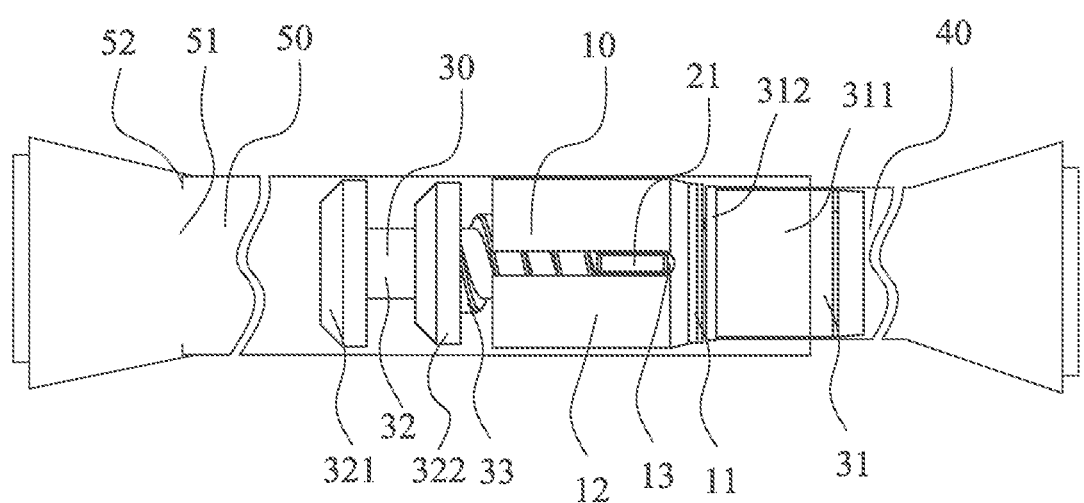
FIG. 7 is the other perspective view of the telescopic rod assembly according to the present invention.

Referring to FIG. 7, a telescopic rod assembly includes an inner rod 40, an outer rod 50 and a telescopic rod connector 1 connecting them. The telescopic rod connector 1 comprises a screw rod 30, an inner sleeve 30 and an outer sleeve 10.

The screw rod 30 has opposite a first end 31 and a second end 32, and a rod body 33 between the first end 31 and the second end 32. The first end 21 is fixedly connecting with the inner rod 40.

The inner sleeve 20 sleeves on the rod body 33 and can rotate and slide along the rod body 33, the inner sleeve 20 is provided with positioning convex strips 21.

The outer sleeve 10 matches with the outer rod 50. The outer sleeve 10 includes a notch ring 11 and a plurality of outer arc members 12 extending from the notch ring 11. U-shaped notches 13 are arranged between adjacent two the outer arc members 12, and the number of the U-shaped notches 13 is equal to that of the positioning convex strips 21; the outer sleeve 10 is wrapped around the inner sleeve 20 and the notch ring 11 is close to the first end 31, the positioning convex strips 21 are inserted into the U-shaped notches 13.

The telescopic rod connector 1 and the inner rod 40 are inserted into the outer rod 50, the outer rod 50 is rotated relative to the inner rod 40, driving the outer sleeve 10 to rotate. The outer sleeve 10 is rotated to drive the inner sleeve 20 to slide along the rod body 33. When the inner sleeve 20 slides along the direction from the first end 31 to the second end 32, it extrudes and opens the outer arc members 12 so that the outer rod 50 is fixed relative to the inner rod 40. When the inner sleeve 20 slides along the direction from the second end 32 to the first end 31, the outer arc members 12 is closed up so that the outer rod 50 is detachable from the inner rod 40.

When the inner rod 40 is inserted into the outer rod 50, the inner rod 40 and the outer rod 50 can be relatively fixed at any position through the telescopic rod connector 1, so that the length of the telescopic rod assembly can be adjusted flexibly to be mounted between the walls with different distances or the door frames with different distances. When the telescopic rod assembly is mounted, one end of it is attached to a door frame or a wall, the outer rod 50 is rotated until it is fixed relative to the inner rod 40 and the other end of the telescopic rod assembly is attached to the other door frame or the other wall so that the installation is achieved. When it needs to disassemble the telescopic rod assembly, the outer rod 50 is rotated reversely to release the fixed connection of the outer rod 50 and the inner rod 40, the inner rod 40 is slid into the outer rod 50. The telescopic rod assembly is easy to install and disassemble.

In some embodiments, a first helix 34 and a first lifting groove 35 are wound around the rod body 33. The first helix 34 and the first lifting groove 35 are alternatively arranged at internals.

Referring to FIG. 3 and FIG. 4, the inner sleeve 20 comprises at least two arc members 22 and at least one connecting piece 23. The connecting piece 23 connects adjacent two the arc members 22 to form a breaking cylinder with a notch 26. It should be understood that the number of the arc members 22 and that of the connecting piece 23 can be designed as needed. When the size of the rod body 23 is larger, the number of the arc members 22 is more than 2, for example, 3 or 4, accordingly, the number of the connectors 23 is 2 and 3.

Referring to FIG. 3 and FIG. 4, the inner sleeve 20 is provided with a second helix 24 and a second lifting groove 25 on the arc members 22; the first helix 34 is matched with the second lifting grooves 25, and the second helix 24 is matched with the first lifting groove 35 so that the inner sleeve 20 can rotate and slide around the rod body. It should be understood that the second helix 24 is correspondingly arranged on the inner wall of the are members 22, respectively, and the second lifting grooves 25 are correspondingly arranged on the inner wall of the arc members 22.

The arc members 22 are capable of rotating around the connecting piece 23 they attaches, thus opening the inner sleeve 20 for easy mounting on the rod body 33. At the notch 26, a slot (not shown) and a convex 27 matching each other are arranged on the side of the two arc members 22. When the inner sleeve 20 is wrapped by the out sleeve 10, the card convex 27 is inserted into the slot, thus locking the inner sleeve 20.

Preferably, the height of the connecting piece 23 is less than the height of the arc member 22, so that a second notch 28 is formed between the two arc members 22.

The arc members 22 are provided with the positioning convex strips 21, which is preferably arranged in the same direction as the center axis of the rod body 33.

Preferably, the outer diameter of the rod body 33 increases gradually from the first end 31 to the second end 32. These structure enables the inner sleeve 20 to further open the outer arc members 12 as it rotates from the first end 31 to the second end 32 so that the outer rod 50 can be fixed with rotating at a smaller angle.

The thickness of the outer arc member 12 increases gradually from the opening ring 11. The structure enables the inner sleeve 20 to achieve the clamping effect by turning the outer rod 50 at a smaller angle when it rotates along the direction from the first end 31 to the second end 32.

The outer rod 50 has an outer rod end 52, the outer rod end 52 is provided with a shrinkage opening 51, its diameter of the shrinkage opening 51 is smaller than its inner diameter of the outer rod 50. The second end 32 is provided with a first limiting plane 321, and the diameter of the first limiting plane 321 is smaller than the diameter of the shrinkage opening 51. When the telescopic rod connector reaches the shrinkage opening 51, the first limiting plane 321 is blocked by the shrinkage opening 51 and cannot extend out.

Further, the second end 32 is also provided with a second limiting plane 322 close to the rod body 33, the diameter of the second limiting plane 322 is slightly larger than the diameter of the first limiting plane 321 and the diameter of the shrinkage opening 51, and less than the inner diameter of the outer rod 50 so that further block the telescopic rod connector extend out the shrinkage opening 51.

The first end 31 is provided with a cylinder 311 with a limiting ring 312 protruding outward near one side of the rod body 33, the cylinder 311 matches with the inner rod 40, its outer diameter of the limiting ring 312 is slightly larger than its inner diameter of the inner rod 40 so that avoiding the telescopic rod connector from dropping in the inner rod 40.

The inner sleeve 20 and the outer sleeve 10 slides between the second limiting plane 322 and the limiting ring 312 along the rod body 33.

The above is a further detailed description of the invention in combination with a specific preferred embodiment, and it can not be concluded that the specific implementation of the invention is limited to these instructions. For the general technical personnel in the technical field to which the invention belongs, without being separated from the conception of the invention, the architecture form can be flexible and changeable, and a series of products can be derived. If it is just making a number of simple deductions or substitutes should be regarded as falling within the scope of patent protection determined by the claim submitted by the present invention.

The invention claimed is:

1. A telescopic rod connector, wherein comprising:
a screw rod, said screw rod has opposite a first end and a second end, and a rod body between them, an inner sleeve, said inner sleeve sleeves on said rod body and can rotate and slide along said rod body, said inner sleeve is provided with positioning convex strips;
an outer sleeve, said outer sleeve includes a notch ring and a plurality of outer arc members extending from said notch ring; U-shaped notches are arranged between adjacent two said outer arc members, and its number of said U-shaped notches is equal to that of said positioning convex strips; said outer sleeve is wrapped around said inner sleeve and said notch ring is close to said first end, said positioning convex strips are inserted into said U-shaped notches, respectively;
said outer sleeve is rotated to drive said inner sleeve to slide along said rod body, when said inner sleeve is sliding from said first end to said second end, said outer arc members are squeezed and opened, and when said inner sleeve is sliding from said second end to said first end, said outer arc members are closed up.

2. The telescopic rod connector according to claim 1, wherein a first helix and a first lifting groove are wound around said rod body.

3. The telescopic rod connector according to claim 2, wherein said inner sleeve includes at least two arc members and at least one connecting piece, said connecting piece connects adjacent two said arc members to form a breaking cylinder with at least a notch; said inner sleeve is provided with a second helix and a second lifting groove on its inner wall of said arc member; said first helix is matched with said second lifting groove, and said second helix is matched with said first lifting groove so that said inner sleeve can rotate and slide around said rod body; its outer wall of said arc member is provided with said positioning convex strips.

4. The telescopic rod connector according to claim 2, wherein its diameter of said rod body increases gradually from said first end to said second end.

5. The telescopic rod connector according to claim 3, wherein its thickness of said outer arc member increases gradually from said notch ring.

6. The telescopic rod connector according to claim 1, wherein said second end is provided with a first limiting plane.

7. The telescopic rod connector according to claim 1, wherein said first end is provided with a cylinder with a limiting ring protruding outward near one side of said rod body.

8. A telescopic rod assembly, which includes an inner rod, an outer rod and a telescopic rod connector connecting them, wherein said telescopic rod connector comprising:
a screw rod, said screw rod has opposite a first end and a second end, and a rod body between them, said first end is fixedly connected with said inner rod;
an inner sleeve, said inner sleeve sleeves on said rod body and can rotate and slide along it, said inner sleeve is provided with positioning convex strips;
an outer sleeve, said outer sleeve matches with said outer rod, said outer sleeve includes a notch ring and a plurality of outer arc members extending from said notch ring; U-shaped notches are arranged between adjacent two said outer arc members, and its number of said U-shaped notches is equal to that of said positioning convex strips; said outer sleeve is wrapped around said inner sleeve, said notch ring is close to said first end, said positioning convex strips are inserted into said U-shaped notches, respectively;
said telescopic rod connector and said inner rod are inserted into said outer rod; said outer rod is rotated relative to said inner rod, driving said outer sleeve to rotate; said outer sleeve drive said inner sleeve to rotate and slide along said rod body; when said inner sleeve is sliding from said first end to said second end, said outer arc members are squeezed and opened so that said outer rod is relatively fixed with said inner rod, and when said inner sleeve is sliding from said second end to said first end, said outer arc member is closed up so that said outer rod can be detachable from said inner rod.

9. The telescopic rod assembly according to claim 8, wherein said outer rod has an outer rod end, said outer rod end is provided with a shrinkage opening, its diameter of said shrinkage opening is smaller than its inner diameter of said outer rod, said second end is provided with a first limiting plane, and its diameter of said first limiting plane is smaller than its diameter of said shrinkage opening.

10. The telescopic rod assembly according to claim 9, wherein said second end is also provided with a second limiting plane, its diameter of said second limiting plane is slightly larger than its diameter of said first limiting plane and its diameter of said shrinkage opening, and less than its inner diameter of said outer rod.

11. The telescopic rod assembly according to claim 8, wherein said first end is provided with a cylinder with a limiting ring protruding outward near one side of said rod body, said cylinder matches with said inner rod, its outer diameter of said limiting ring is slightly larger than its inner diameter of said inner rod.

12. The telescopic rod assembly according to claim 8, wherein a first helix and a first lifting groove are wound around said rod body.

13. The telescopic rod assembly according to claim 8, wherein said inner sleeve includes at least two arc members and at least one connecting piece, one connecting piece connects adjacent two said arc members to form a breaking cylinder with at least a notch; said inner sleeve is provided with a second helix and a second lifting groove on said arc members; said first helix is matched with said second lifting groove, and said second helix is matched with said first lifting groove so that said inner sleeve can rotate and slide around said rod body; its outer wall of said arc members is provided with said positioning convex strips.

14. The telescopic rod assembly according to claim 8, wherein its outer diameter of said rod body increases gradually from said first end to said second end.

15. The telescopic rod assembly according to claim 8, wherein its thickness of said outer arc member increases gradually from said notch ring.

* * * * *